(12) United States Patent
Tiquet (10) Patent No.: US 8,778,555 B2
(45) Date of Patent: Jul. 15, 2014

(54) JOINT-FREE INTEGRATED FUEL CELL ARCHITECTURE

(75) Inventor: Pascal Tiquet, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 194 days.

(21) Appl. No.: 12/738,930

(22) PCT Filed: Oct. 22, 2008

(86) PCT No.: PCT/EP2008/064304
§ 371 (c)(1),
(2), (4) Date: Apr. 20, 2010

(87) PCT Pub. No.: WO2009/053398
PCT Pub. Date: Apr. 30, 2009

(65) Prior Publication Data
US 2010/0239938 A1   Sep. 23, 2010

(30) Foreign Application Priority Data

Oct. 24, 2007   (FR) ..................... 07 58551

(51) Int. Cl.
*H01M 2/14* (2006.01)
*H01M 2/38* (2006.01)
*H01M 2/40* (2006.01)
*H01M 8/24* (2006.01)

(52) U.S. Cl.
USPC ........... 429/465; 429/458; 429/463; 429/483; 429/516

(58) Field of Classification Search
USPC ................................. 429/400–535
See application file for complete search history.

(56) References Cited

U.S. PATENT DOCUMENTS

| | | |
|---|---|---|
| 3,607,418 A | 9/1971 | Ortlieb et al. |
| 6,080,503 A | 6/2000 | Schmid et al. |
| 6,475,656 B1 * | 11/2002 | Koschany et al. ............ 429/483 |
| 6,495,278 B1 | 12/2002 | Schmid et al. |
| 6,531,238 B1 * | 3/2003 | King .............................. 429/457 |
| 7,205,062 B2 | 4/2007 | Tawfik et al. |
| 7,226,684 B2 | 6/2007 | Pflaesterer |
| 7,232,582 B2 | 6/2007 | Kikuchi et al. |
| 2003/0235744 A1 | 12/2003 | Pflaesterer |
| 2004/0053100 A1 | 3/2004 | Stanley et al. |

(Continued)

FOREIGN PATENT DOCUMENTS

| | | |
|---|---|---|
| DE | 197 13 250 A1 | 10/1998 |
| EP | 1 482 583 A2 | 12/2004 |

(Continued)

OTHER PUBLICATIONS

International Preliminary Report on Patentability Issued on Oct. 13, 2009 in PCT/EP08/064304 filed Oct. 22, 2008.

(Continued)

*Primary Examiner* — Kenneth Douyette
*Assistant Examiner* — James Lee
(74) *Attorney, Agent, or Firm* — Oblon, Spivak, McClelland, Maier & Neustadt, L.L.P.

(57) ABSTRACT

A fuel cell element including an assembly of a membrane, a first electrode, and a second electrode, and a mechanism holding the assembly together, which forms a peripheral support thereof and that includes an electrical connection and a mechanism for circulation of fluid and for supply of the fluid into the assembly.

32 Claims, 9 Drawing Sheets

(56) References Cited

U.S. PATENT DOCUMENTS

2004/0101736 A1   5/2004   Tawfik et al.
2005/0026028 A1*  2/2005   Ouchi et al. .................... 429/38
2005/0084736 A1*  4/2005   Chang et al. .................... 429/38

FOREIGN PATENT DOCUMENTS

| EP | 1 482 583 A3 | 12/2004 |
|----|--------------|---------|
| FR | 1 593 242 | 5/1970 |
| JP | H1-128366 | 5/1989 |
| JP | H2-46661 | 2/1990 |
| JP | H6-349508 | 12/1994 |
| JP | 2005-532661 | 10/2005 |
| JP | 2005-322543 | 11/2005 |
| WO | 2007 084472 | 7/2007 |

OTHER PUBLICATIONS

U.S. Appl. No. 13/259,947, filed Sep. 23, 2011, Mailley, et al.
Office Action issued Oct. 22, 2013 to Japanese Patent Application No. 2010-530444, with English translation.

* cited by examiner

JOINT-FREE INTEGRATED FUEL CELL ARCHITECTURE

TECHNICAL FIELD AND PRIOR ART

The invention relates to the field of fuel cells. It especially relates to a novel structure of elements to make such a fuel cell, as well as a fuel cell obtained by stacking and assembly of said elements.

Figures 1A, 1B:
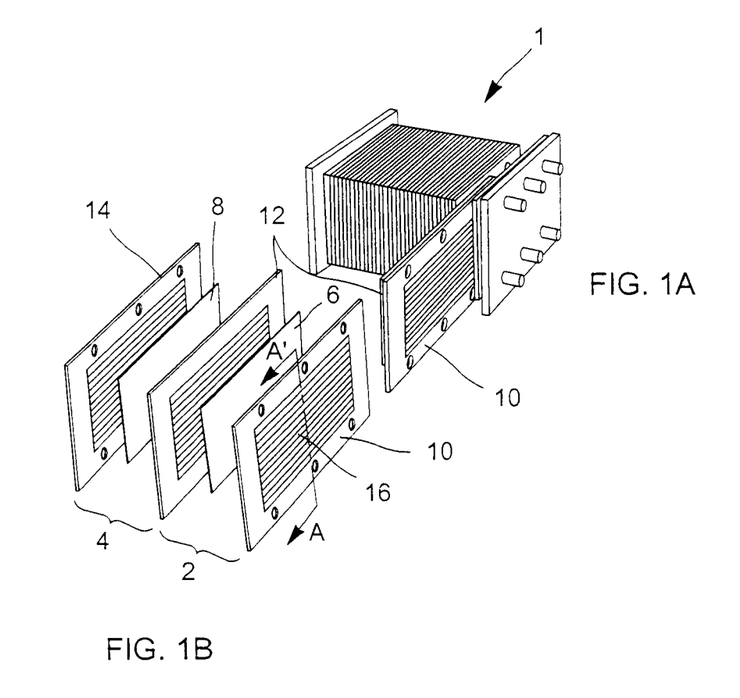
FIGS. 1A-1C represent a structure of fuel cells according to the prior art.

As illustrated in FIGS. 1A and 1B, a fuel cell 1 of known structure comprises several modules 2, 4, etc. each comprising a membrane electrode assembly (or MEA) 6, 8, etc. Each MEA is flanked by two plates known as bipolar plates, separated from each other by a joint. Three plates 10, 12, 14 are represented in FIG. 1B, the plate 12 being common to the pairs of plates 10, 12 and 12, 14.

The bipolar plates 10, 12, 14 are made for example of stamped stainless steel or instead made of machined graphite and thus add weight to a device for which one of the performance criteria is, precisely, the power produced per unit weight. But these plates ensure, apart from the distribution of gases, the electrical connection of two successive cells, and the circulation of a heat conveying fluid to control the exothermic energy of the electrochemical reactions. The distribution of gases is more precisely obtained by channels, designated by the reference 16 for the plate 10 of FIG. 1B, which are thus situated in front of the active surface of each MEA.

The joints also ensure, with more or less success, one sealing to hydrogen of each cell and are arranged on either side of each bipolar plate and each MEA.

A minimal leakage rate of hydrogen and a minimal internal electrical resistance is obtained by carrying out a tightening of the set of bipolar planes, MEA and joints.

Figure 1C:
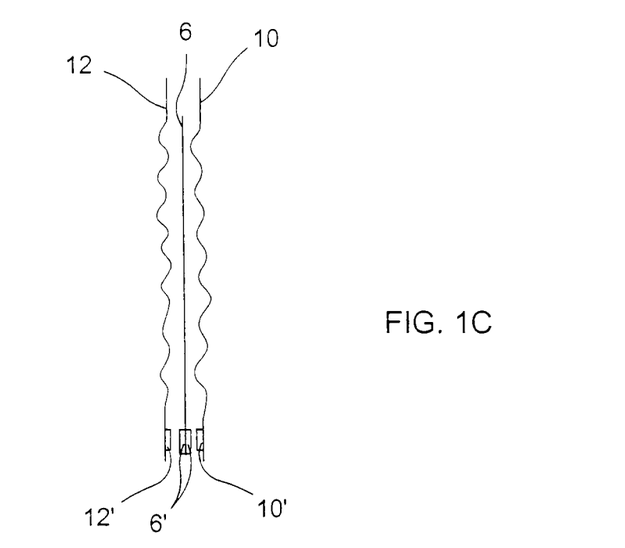

FIG. 1C represents, in sectional view, according to a plane passing along the axis AA' of FIG. 1B, the relative lay out of an MEA 6 and two bipolar plates 10, 12. During the above mentioned tightening operation, the plates 10,12 are going to come practically into contact with the MEA 6, and sometimes even deform said MEA: there thus remains only a very small space between these plates and this membrane for the circulation of the gases necessary for the reaction, namely hydrogen on one side and oxygen or air on the other. Furthermore, in operation, in other words when the reactions take place, water is released from the oxygen or air side. This water tends to swell and flood the MEA 6. Since said MEA is already situated almost in contact with the plates 10, 12, the circulation of gases becomes highly disrupted, and the efficiency of the cell drops considerably. The phenomenon may moreover propagate from cell to cell and disrupt the arrival of the gaseous reactants.

Consequently, apart from the problem posed by their weight, the plates take up too much space in the fuel cell. And, through their positioning, they reduce the active surface by a factor of two and compress the fuel cell core in a heterogeneous manner.

In FIG. 12 are also represented the joints 6', 10', 12' situated on the one nana on the MEA 6 and on the other hand on the plates 10, 12. These joints are intended to come into contact with each other and, as explained above, they are thus going to be crushed against each other during the tightening of the set of cells 2, 4, etc. to constitute the fuel cell 1.

For each MEA, the sealing between the hydrogen compartment and the oxygen or air compartment is thus ensured by the joints, which implies the use of a large number of joints. Here again, the tightening already mentioned aims to ensure this sealing, but it must not be too high to avoid damaging the MEA 6, 8, and particularly their active layers. This compromise regarding the tightening becomes more and more difficult to achieve when several hundreds of MEA have to be assembled. Furthermore, the strength of this assembly over time is not good because all the tightening pressure is exercised by means of sealing joints 6', 10', 12'. Over time, the joints, subjected to the operating temperatures of the fuel cell, are going to creep, and the tightening pressure drops little by little, which leads to the lowering of the contact pressures between the bipolar plates and the MEA, accordingly reducing the performance of the fuel cell. The use of joints in the design of the fuel cell thus introduces an important variable regarding the reliability and the performance of the fuel cell.

Another problem is the relatively low power density of such a system.

Figure 1D:
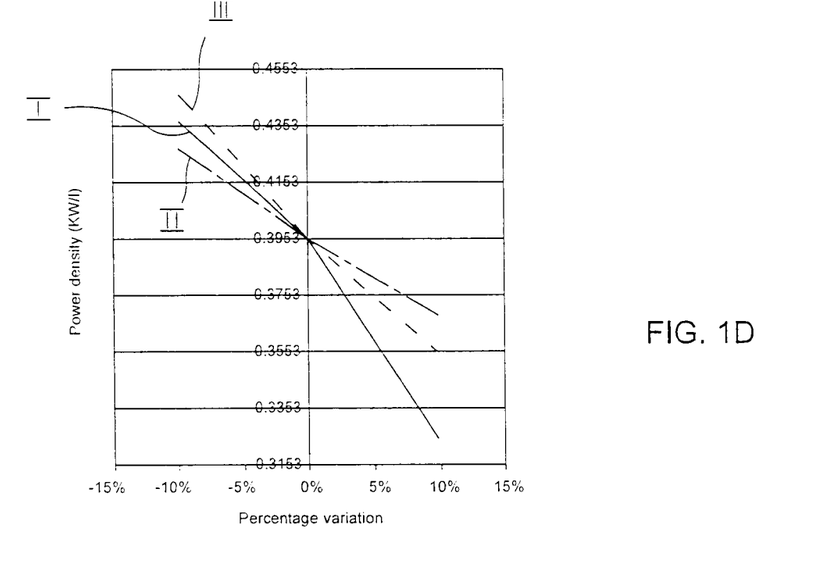
FIG. 1D represents the result of a sensitivity study on the power density of a fuel cell with bipolar plates.

FIG. 1D shows that the power density essentially depends, to the first order, on the efficiency of the fuel cell (curve I), the density of the material of the bipolar plates (curve II), and the thickness of said plates (curve III). Other parameters, such as the number of cells, the density of the materials constituting the tightening studs, the thickness of the tightening plates, the active surface of each cell, also have an influence, but much less important than that of the three above mentioned parameters.

Numerous known devices are made, as explained above, with bipolar plates and MEA. Such a system is described for example in document US 2004/0101736.

Document U.S. Pat. No. 7,226,684 describes another method for sealing elements of a stack and making said stack more leak tight to hydrogen, without calling into question the use of bipolar plates. The problems evoked above in relation to the use of said plates thus remain the same. The whole of the stack is crimped, and not bolted, but the pressure necessary to maintain the elements in position and maintain the sealing remains the same as in the case of an assembly technique such as described in US 2004/0101736 (cited above). Moreover, the use of a lateral sealing strip (reference 20 in the figures of this document) requires an exact thickness of this strip (substantially equal to the thickness of the MEA). The uncertainties of positioning of this strip, during deformations, inevitably lead to the same problems, or equivalent problems, as those evoked above.

Consequently, both the bipolar plates and the joints pose problem in known architectures.

A novel architecture of fuel cell elements that does not represent the above mentioned problems thus needs to be found.

DESCRIPTION OF THE INVENTION

The invention firstly relates to a fuel cell element, comprising an assembly (MEA) of a membrane, a first and a second electrode, and means for holding this assembly together, which form peripheral support thereof and which comprise electrical connection means and means for the circulation of fluid and for the supply of this fluid into said assembly.

According to the invention, a cell or a fuel cell element comprises an MEA and an MEA support, formed, for example moulded, at its periphery. All of the means for electrical connection, circulation of fluid and for the supply of this fluid to the MEA are contained or integrated in this support.

The entire periphery of the MEA is thus immersed in the material forming the support.

Each cell or element thus comprises conductive areas, made in the material forming support for the MEA, for example by overmoulding outside of the active area of the MEA. Overmoulded conductive areas are compatible with a very good continuity and a maximum sealing.

The means for holding one assembly together may be made of a thermoplastic polymer, for example polyethylene, or polypropylene, or polystyrene, or COC (cyclo olefin copolymer or cyclo-olefin cyclo-aliphatic), or PTFE (or Teflon), or PET, or PEEK (polyether-poly-acetone or polyether ether ketone).

A thermoplastic polymer may further comprise nanotubes of carbon or carbon black or nanowires of silicon, and/or carbon and/or copper and/or aluminium, which makes it possible to improve the evacuation of heat by the moulding material during the operation of the element in a fuel cell.

The electrical connection means may comprise at least one conductive insert connected to at least one of the electrodes of the membrane. These are for example metallic means, or a conductive polymer, for example a polymer with carbon nanotubes or nanowires.

As for the electrodes of each membrane, they may be made of carbon fibre or a weaving of carbon fibres with wires of gold, or copper, or aluminium.

Preferably, the means for the circulation and the supply of fluid comprise lateral channels that traverse the support, and channels for the distribution of fluid, from the lateral channels to the membrane electrode assembly. The fluid distribution channels may comprise islands that guide the fluid to the membrane electrode assembly.

The means for holding the MEA together, forming support, make it possible to apply a mechanical strain such that the membrane cannot deform, along a direction perpendicular to one membrane, beyond a certain limit, particularly beyond a plane that lies on the exterior surface of the support and which is substantially parallel to the membrane. Thus, two membranes of neighbouring elements cannot come into contact with each other.

The electrodes are preferably made of a porous material, the means for holding the assembly together being made of a material that penetrates into said porous material.

According to one embodiment, the electrical connection means comprise at least two conductive elements that traverse the support, and in which at least one of the two is connected, by a secondary conductor, to one of the first and second electrodes.

According to another embodiment, the electrical connection means comprise at least two conductive elements that only traverse the support in part and from different faces of the support, and each of which is connected, by a secondary conductor, either to one or to the other of the first and second electrodes.

A fuel cell according to the invention comprises a stack of elements according to the invention, the peripheral means of holding the MEA together being assembled two by two in a sealed manner, the means for electrical connection of neighbouring MEA being connected together and the means for the circulation of fluid forming at least one circuit for the flow of fluid through said stack.

The known bipolar plates and the technical joints may thus be eliminated, while at the same time keeping the functions of electrical connection and distribution of combustible gases. The problems already explained above and deriving from the presence of bipolar plates and joints are thus avoided.

The different elements of the stack may be welded two by two, for example welding without addition of material, by a technique such as that of the hot plate.

The electrical connection means are assembled so as to form a circuit with connection in series, or with connection in parallel, or with connection partially in series and partially in parallel. Consequently, according to the lay out of the connection points of electrical contacts on the electrodes and in the MEA supports, the cells can be connected in parallel or in series or according to a mixture of these two configurations.

The stack of elements may be between an input face and an output face, the input face comprising gas introduction means, and one of the two input and output faces comprising electrical connection means. The gas introduction means comprise at least two flow rate regulators.

Furthermore, means form a return electrical circuit, between the face that comprises the electrical connection means and the element of the stack that is the furthest from this face.

The invention also relates to a method for making a fuel cell element, comprising:

a) a step of moulding of the periphery of an assembly of a membrane, of a first and a second electrode, to form means for holding said assembly together, b) a step of forming, in said means for holding together;
b1) electrical connection means,
b2) means for the circulation of fluid and for the supply of this fluid to said membrane electrode assembly.

The electrical connection means may be formed by moulding of a metal insert, or by injection of a conductive polymer into said means for holding the membrane together.

According to an alternative, the electrical connection means are formed by making at least one opening in said means for holding the membrane together, and inserting a connector into said opening.

The invention also relates to a method for making a cell of a fuel cell, without joint and without bipolar plates. Such a method comprises an assembly, by welding or bonding, of a plurality of elements according to the invention.

A prior step of alignment of the elements to be assembled may be implemented, for example by control of at least one electrical property of the set of elements.

The invention also relates to a press jaw comprising means for measuring the electrical properties of an object in contact with said jaw, as well as a press comprising two such jaws.

BRIEF DESCRIPTION OF DRAWINGS

FIG. 3 is a sectional view of an MEA represented in FIGS. 2A and 2B, FIGS. 4A to 4D represent elements according to the invention, intended to be assembled to form a fuel cell.

DETAILED DESCRIPTION OF SPECIFIC EMBODIMENTS

Figure 2A:
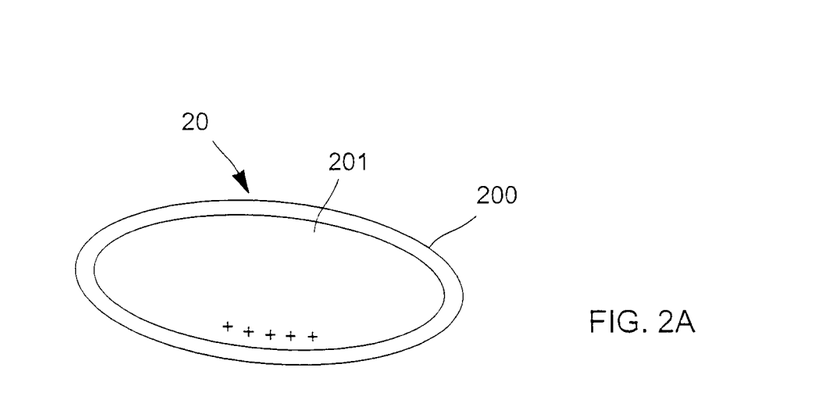
FIGS. 2A and 2B represent the structure of an MEA that can be implemented within the scope of the present invention.
Figure 2B:
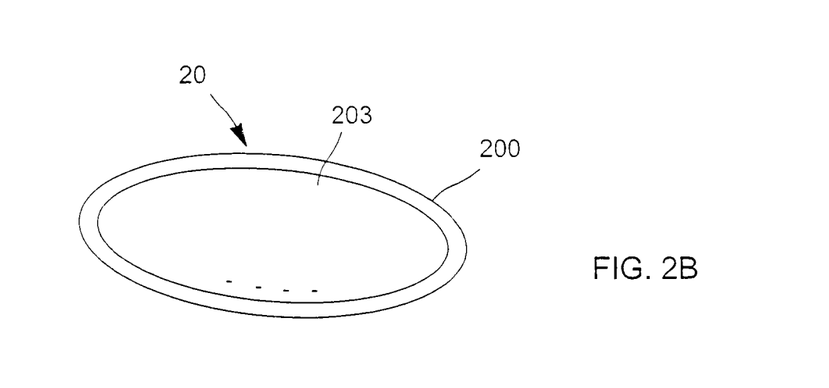

A membrane electrode assembly (MEA) 20, that can be implemented in an element according to the invention, comprises, as illustrated in FIGS. 2A and 2B, a central part 200, the membrane, essentially constituted of a material of perfluoropolymer or polyimide or polyether type, such as the material commercialised by Du Pont de Nemours under the trade name Naphion©. This membrane lies between two layers of electrodes 201, 203 (identified by their polarity "+" and "–" in the two FIGS. 2A and 2B, but they are obviously neutral when no voltage is applied, to the device).

These electrodes 201, 203 are for example made from a mixture of graphite and platinum, said mixture may be in one form of a pulverised powder rendered partially hydrophobic by a fluoropolymer (Teflon type). On each of these electrodes may be formed a deposition or coating 201', 203' of a porous material, for example constituted of carbon fibres.

For this deposition or coating 201', 203', a weaving of carbon fibres with wires of gold, or copper, or aluminium, may also be used. This type of material is more expensive but makes it possible to increase its power while at the same time allowing the gases to traverse the porous material thereby constituted. It also makes it possible to work with larger membrane surfaces, substantially of the order of 20 cm*30 cm.

The circular or elliptical shape of FIGS. 2A and 2B is simply given by way of example, and the invention may be applied to MEA of any shape (square, rectangular, etc.).

Figure 3:
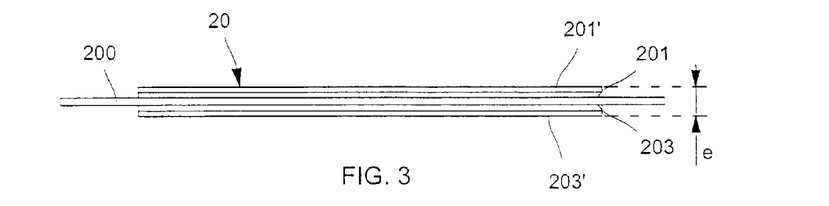

FIG. 3 represents, in section, the MEA 20, with the membrane 200, its electrodes 201, 203 and the coatings 201', 203'. The thicknesses of the different layers and the different coatings are accentuated for reason of clarity in this figure. The assembly has for example a thickness e substantially between, typically, 250 µm and 500 µm.

An example of embodiment of an element according to the invention for a connection in parallel is illustrated in each of FIGS. 4A-4D, where a cell or a fuel cell element comprises an MEA 20, 22, 24, 26 and an MEA support 21, 23, 25, 27 (or frame or means for holding together), moulded to one periphery of the MEA and made of a material of thermoplastic type. Examples of these supports, according to perspective or frontal views, are visible in FIGS. 8 and 9. It may be seen that each support completely surrounds the corresponding MEA.

In each of the supports 21, 23, 25, 27 are formed lateral passages 40, 42, 44, 46 and 40', 42', 44', 46' for the supplies of gases, respectively of hydrogen and oxygen or air. Each of these passages is preferably of substantially cylindrical shape, with an axis arranged along a direction substantially perpendicular to a plane defined by each of the MEA 20, 22, 24, 26. As explained below, secondary channels 400, 400', 420, 420', 440, 440', 460, 460' then enable a distribution of gases from the lateral passages 40-46 and 40'-46' to the MEA and a return of these gases from the MEA to the lateral passages. The material of the supports 21, 23, 25, 27 is leak tight or impermeable to the fluids that have to circulate in the lateral passages and the secondary channels (the permeation coefficient of this material is preferably less than $6\times10^{-17}$ m$^2$/s·Pa).

In each of these supports are also formed conductive inserts 30, 31, 30', 31', 32, 32', 23, 33', 34, 35, 34', 35', 36, 37, 37', 36'. Said inserts comprise main conductors 30, 32, 34, 36 and 30', 32', 34', 36', or lateral conductors, each of preferably substantially rectilinear, or cylindrical, shape and also arranged along a direction substantially perpendicular to a plane defined by each of the MEA 20, 22, 24, 26. From these lateral conductors, conductors 31, 31', 33, 33', 35, 35', 37, 37' known as secondary conductors are arranged, for example in a substantially radial manner, to electrically connect an electrode of the MEA from the support in which they are formed to the corresponding lateral conductor. Thus, in the connection in parallel of FIG. 4A, the conductors 31, 31' connect the lateral conductors 30, 30' to each of the electrodes of the membrane 20. The same is true, for example, for the conductor 37' (respectively 37) which connects the lateral conductor 36' (respectively 36) to one of the electrodes of the membrane 26.

As may be seen in all of FIGS. 4A-4D:
one element out of two has electrical connection means such that each electrode of the MEA is connected to a lateral conductor (for example: each electrode of the MEA 20 is connected to the lateral conductors 30, 30'—which traverse the whole ring 21—by the conductors 31, 31'),
one element out of two has electrical connection means such that each electrode of the MEA, is connected to a lateral conductor (for example: an electrode of the MEA 22 is connected to the lateral conductor 32'—which traverses the whole ring 23—by the conductor 33), whereas the other lateral conductor traverse the whole ring 23, and is connected to the other electrode of the MEA 22.

In order to ensure a good electrical contact between the different segments of lateral conductors 30, 32, 34, 36 and 30', 32', 34', 36' some of them are equipped with contact pads such as the pads 320, 320' and 360, 360', intended to be introduced into corresponding openings 300', 340, 340' of the conductor segments of the supports of immediately neighbouring membranes.

This formation of electrical contacts in the form of conductive inserts is not the only solution, another embodiment for this functionality will be seen later.

Whatever the embodiment envisaged for the set of electrical connection means, these, are, like the means for the circulation of gases, positioned and integrated in lateral parts of the means for holding together 21, 22, 23, 27 so that the active parts of the membranes 20, 22, 24, 26 remain completely free.

The elements of FIGS. 4A-4D are intended to be assembled two by two, as indicated by the arrows situated on the faces of the means for holding together 21, 23, 25, 27 and in the manner explained below. The assembly takes place by bringing into contact the faces 21" and 23', 23" and 25', 25" and 27'. The active parts 20', 20"', 22', 22"', 24', 24"', 26', 26"' of the membranes 20, 22, 24, 26 are thus free of any contact with a plate, unlike known structures which implement bipolar plates (see structure of FIGS. 1A-1C and the associated problems, in particular those described with reference to FIG. 2C).

Given the structure of the electrical connection means (main lateral connectors and secondary connectors) which have been described above with reference to FIGS. 4A-4D, the assembly of the various elements of these figures lead to a set of cells assembled in parallel. The equivalent electrical diagram of these cells is that of FIG. 5B. FIG. 5A represents in a schematic manner each of the membranes 20, 22, 24, 26 with its electrical connexions 30, 32, 34, 36 and 30', 32', 34', 36' and the gas injection means.

Another example of forming an element according to the invention is illustrated in each of FIGS. 6A-6D corresponding to a fuel cell connected in series.

The membranes 20, 22, 24, 26 used are the same as those described above with reference to FIGS. 4A-4D. Likewise, the supports 21, 23, 25, 27 of the MEA as well as the means 40, 42, 44, 46 and 40', 42', 44', 46' for circulating gases are not different from those already described above.

This embodiment differs from the previous embodiment simply by the electrical connection means 30, 31, 30', 31', 32, 33, 32', 33', 34, 35, 34', 35', 36, 37, 36', 37' which here enable a connection in series of the different elements to be made. The main segments 30, 30', 32, 32', 34, 34', 36, 36' thus do not traverse completely the embedding supports 21, 23, 25, 27. The distribution of the segments or secondary connectors is also different from that of FIGS. 4A-4D. Thus, the connector 31 connects the end of the lateral connector 30 contained in the support 21 to one of the electrodes of the MEA 20, whereas the other connecter 31' connects the other electrode of the MEA 20 to the end of the second lateral connector 30', which is also situated in the support 21. The other end of each lateral connector 30, 30' opens into one of the two faces of the element. This distribution is the same for all of the elements that are connected in series from the electrical point of view.

Once again, the formation of electrical contacts in the form of conductive inserts is not the only solution, as will be seen later.

Whatever the structure of the electrical connection means, thus the lay out of the lateral connectors and the secondary connectors of these FIGS. 6A-6D, the two by two assembly of the various elements of these figures (once again according to the arrows situated on the faces of the means for holding together 21, 23, 25, 27, by bringing into contact the faces 21" and 23', 23" and 25', 25" and 27') leads to a set of cells assembled in series.

Figure 7A:
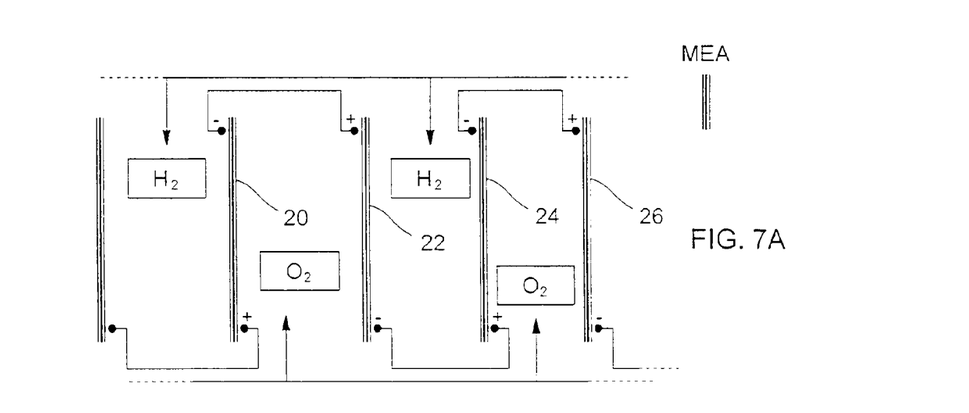
FIG. 7A represents a simplified plan of the architecture of the elements of FIGS. 6A to 6D, after assembly.
Figure 7B:
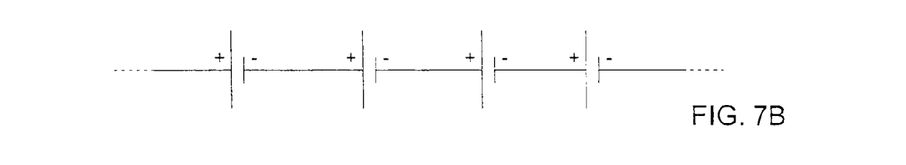
FIG. 7B represents an equivalent electrical diagram of the assembly of the elements of FIGS. 6A-6E.

The equivalent electrical diagram of these cells is that of FIG. 7B.

FIG. 7A represents in a schematic manner each of the membranes 20, 22, 24, 26 with its electrical connections 30, 32, 34, 36 and 30', 32', 34', 36' and gas injection means.

In the above embodiments, on the one hand an electrical diagram in parallel, and, on the other hand, an electrical diagram in series have been presented. A stack of elements according to the invention may also be formed, with elements arranged in series and elements arranged in parallel for example for high power-low voltage applications.

Figure 8:
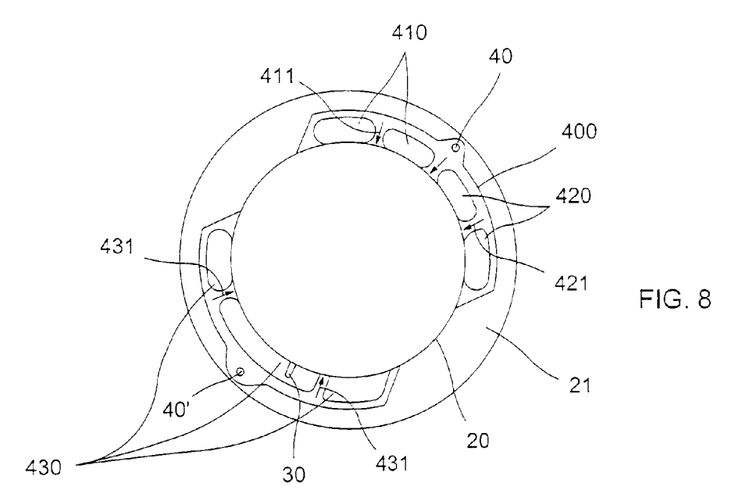
FIG. 8 represents a fuel cell element, according to the invention.
Figure 9:
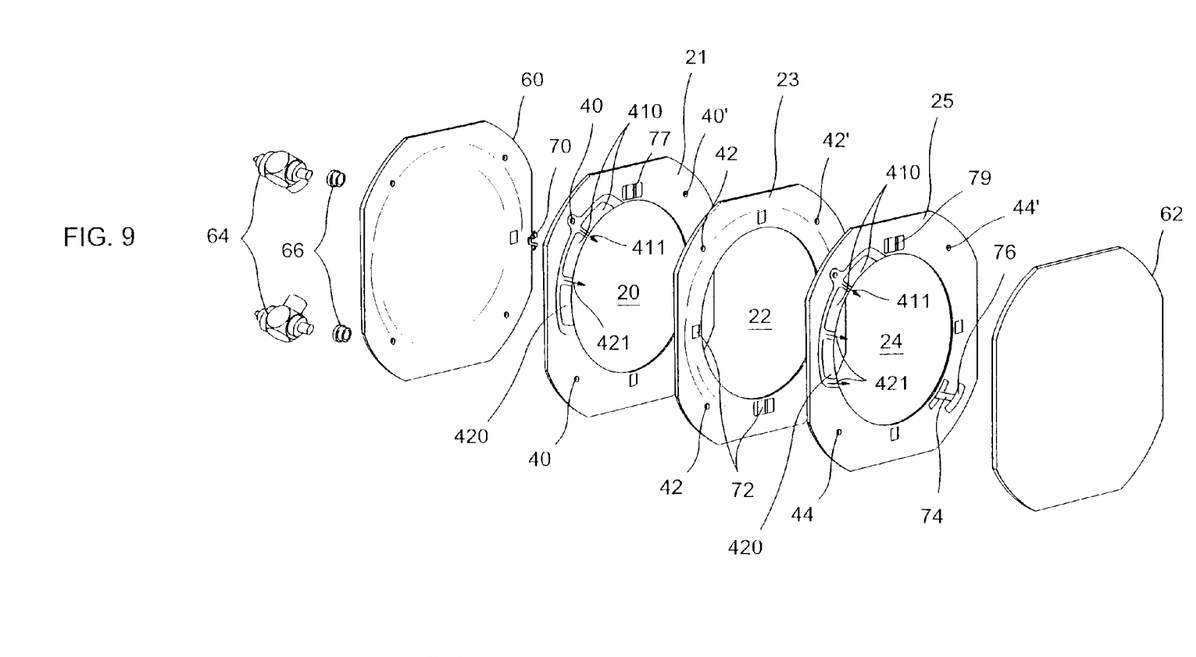
FIG. 9 represents an exploded view of a fuel cell according to one invention.
Figures 10A, 10B:
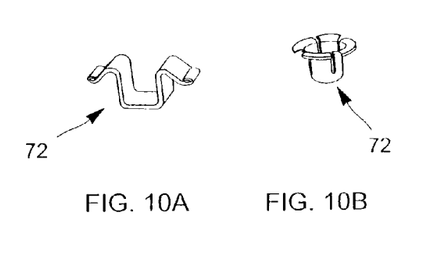
FIGS. 10A-10D are examples of electrical connectors that may be used in fuel cell elements according to the invention.
Figure 10C:
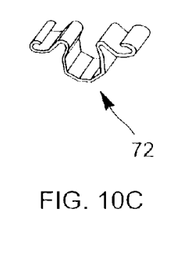
Figure 10D:
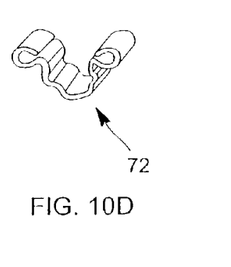

In FIGS. 4A-4D and 6A-6D the references 400, 400, 400', 420, 420', 440, 440', 460, 460' symbolise channels for supplying gases, from one lateral channels 40-46 and 40'-46' in the direction of the MEA. These channels for supplying gases are formed in the volume of the corresponding ring or means for holding together, without going beyond the exterior surfaces 21', 21", 23', 23", 25', 25", 27', 27", which confers considerable compactness to each element. An example of channels formed in the means for holding together 21 is given in FIG. 8 which represents a front view of an element, with its MEA 20 and its support 21. Apart from the lateral channels 40, 40', substantially perpendicular to the figure, secondary channels 400, 400' are etched in the support 21. They can also be obtained during a moulding or a shaping of the material intended to form the support, thus then without the necessity of etching. They define a direction of flow of gases substantially in the plane of the support (or FIG. 8), revealing islands 410, 420, 430 (non etched portions of the support 21) that the gases will circumvent during their circulation in said support 21, after introduction via the main channels 40, 40'. These islands are also visible in FIG. 9, explained below. This circulation of gases to the MEA is represented in FIGS. 8 and 9 by the arrows 411, 421, 431. A reverse circulation, for the evacuation of the gases, from the MEA to the channels 40, 40', also takes place, but it is not represented in the figure for reasons of clarity. On the other face of the element of FIG. 8 are also etched channels for the circulation of another gas. These channels may define a geometry identical or similar to that represented in FIG. 8, or a different geometry. As regards the electrical contacts, only the trace of the contact 30 is represented in FIG. 8. The electrical contacts on each MEA are made in any case in a separate manner from the gas circuit, to avoid the risks of corrosion.

As is clearly apparent in these FIGS. 4A-4D and 6A-6D, the means for the circulation of gases are shifted to the perimeter of the MEA: unlike the devices of known structures, the gases do not have to be brought into contact with the active surface via channels 16 arranged directly opposite active surfaces of the MEA (cf. structure of FIGS. 1A-1C), but are supplied, from the periphery of the supports, via a set of distribution channels that surround each MEA.

Two neighbouring floating membranes limit a fluid chamber. Said fluid chamber is supplied with fluid by the means for holding these membranes together.

The fluid may then freely spread over the whole surface of the membrane: it is then confined between this membrane and the neighbouring membrane that is superimposed on it when a stack of elements is formed. Two neighbouring elements are assembled so that a chamber sees a single type of electrodes, each electrode being associated with one of the two elements.

Figure 11A:
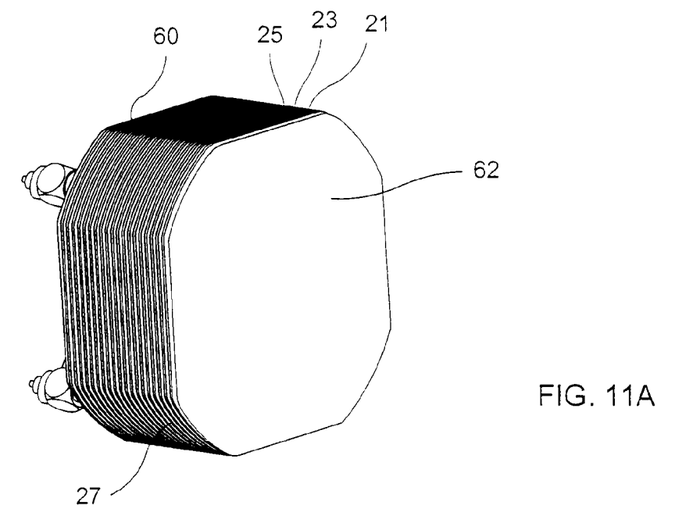
FIGS. 11A and 11B represent a fuel cell according to the invention, after assembly of its individual elements.
Figure 11B:
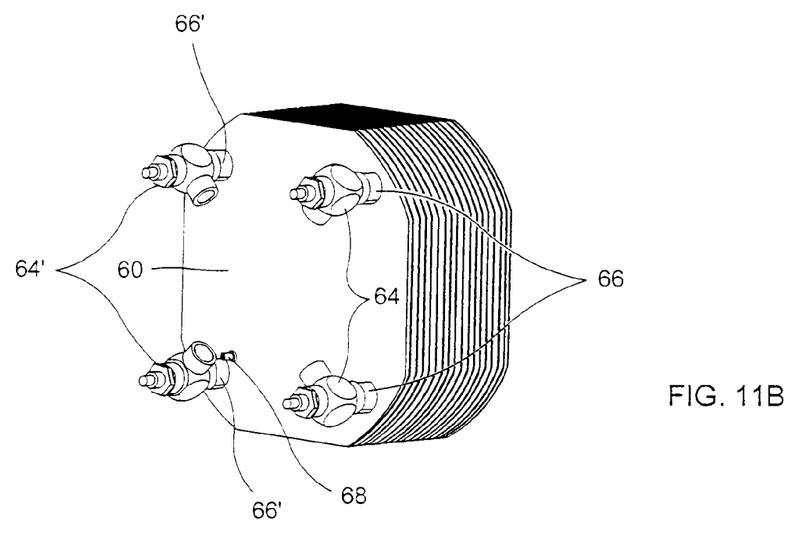

FIG. 9 represents an assembly of several elements 20, 22, 24 according to the invention, so as to make a fuel cell. Only three elements are represented in the figure, but a fuel cell may comprise a stack of any number of elements according to the invention. Thus, in each of FIGS. 11A and 11B is represented, according to two different views, an assembly of 15 elements according to the invention. As already explained above, the rings or supports 21, 23, 25 are formed, preferably overmoulded, on the periphery of each of the membranes 20, 22, 24.

The active elements 20, 22, 24, etc. are between a cover or an input face 61 and a cover or a closing face 62. The input cover 61 supports inserts 66 on which may be fixed flow rate regulators 64, 64'. Said regulators are for example of "banjo" type. In line regulators may also be used, which are more bulky, but which facilitate the connection with a cartridge of hydrogen. According to yet another alternative, instead of these regulators, pre-adjusted jet blocks may be used.

Inserts 66, 66' in FIG. 11B enable the connection of the flow rate regulators or jet blocks onto the input cover 60. They may be overmoulded, or welded by ultrasounds, or crimped by expansion.

In FIG. 11B are again shown the set of these elements, with, moreover, two other inserts 66' to which are connected two other means 64' that are also of flow regulator type (for example of the type mentioned above) or of jet block type. In this figure, means 68 for making an exterior electrical connection may also be distinguished. These means may have for example the shape of a stud on which may be screwed a ring or slotted tongue terminals. Other types of connection means may be formed: for example, male/female, flat or round terminals.

In FIG. 9 other elements also appear.

An internal connector 70, for positive pole, ensures the electrical contact between the first face of the first MEA 20 and the exterior connector 68.

In the embodiment presented in this figure, two internal connectors 72 make it possible to electrically connect two faces of MEA of same polarity. The electrical connection means are thus different from those that have been described in FIGS. 4A-4D and 6A-6D. Here, it does not thus involve conductive inserts, but electrical contacts formed by connectors 72 introduced (or "clipped") into openings 77, 79, and maintained by spring effect in these openings. Other solutions may be employed to reinforce the contact, in particular solutions of plastic mini-rivets type or conductive double face adhesive; more generally, one ring out of two (here the ring 23) is equipped with two internal connectors 72, making it possible to establish the electrical contact with the membrane 20 of the previous ring 21 and the membrane 24 of the following ring 25. In FIGS. 10A-10D various examples of connector 72 are represented. These connectors, like the parts 70, 74, 76, will preferably be made of copper alloy, for example by folding, or stamping, or profiling, or bar turning.

The formation of the connection means is easier to implement than that of the conductive inserts of FIGS. 4A-4D, 6A-6D: the latter must be formed during operations of moulding of one supports 21, 23, 25, whereas the openings 77, 79, one connectors 72 and their introduction into said openings may be carried out easily after these moulding operations.

The reference 74 designates a return circuit: it involves a part that, starting from the ring situated the nearest to the closing face 62, traverses all of the stacked rings 21, 23, 25, in order to connect them to the exterior connector 68. This part 74, forming return circuit, may be flat or cylindrical.

A connecter 76, for negative pole, ensures the electrical contact between the final face of the final MEA 24 and the return circuit 74.

The input cover 60 bears the input and output means of the gas circuits and ensures the holding together of the two electrical connectors 70—inserted directly in the input face—and 76—inserted, in the final element 25, in front of the output face 62. This delimits the furthest point of each gas circuit, before returning to the output points 64, 64' of the input face 60.

The various elements 60, 21, 23, 25, 62 of FIG. 9—like those of FIGS. 4A to 4D and 6A to 6D—are intended to be assembled by welding, for example by ultrasounds or by hot plate, or by laser. Another assembly technique is bonding, but the sealing is less good than that of the welding technique.

An advantage of a structure of elements according to the invention—which does not comprise any bipolar plate—is that each element is free of any contact with other elements: there is thus no contact with bipolar plates such as chose used in the devices of the prior art, which enables a totally free circulation of reactive gases (oxygen and hydrogen) between the MEA. This advantage clearly appears on the stacks of FIGS. 4A-4D and 6A-6D, on which the active faces 20', 20", 22', 22", 24', 24", 26', 26" of the membranes 20, 22, 24,26 are free of any contact with any other element. Moreover, the gas supply means and the electrical connection means are shifted laterally, into the MEA supports.

Another advantage is that this structure is compatible with any surface and any shape of MEA: whatever the size of said MEA, it may be embedded in a maintaining ring such as the rings 21, 23, 25, 27.

A material that could be used to make these rings or supports moulded around each MEA is a polymer, of thermoplastic type. It is possible to enhance the sealing properties of such a material by carrying out a slow crystallisation. By way of example, polyethylene, or polypropylene, or polystyrene, or COC (cyclo olefin copolymer), or PTFE (or Teflon), or PET, or PEEK (polyether ether ketone) may be used.

The inserts used to make the electrical contact elements (designated by the references 30, 31, 30', 31', 32, 33, 32', 33', 34, 35, 34', 35', 36, 37, 36', 37' in FIGS. 6A-6D) may be metallic, or instead made of a conductive polymer, for example a polymer with carbon nanotubes or nanowires such as already mentioned above. The use of metal inserts does not exclude any risk of leakage. On the other hand, a conductive polymer is going to, at the moment of the assembly of two neighbouring elements, by thermal effect as explained below, amalgamate with the polymer that surrounds it, which ensures a perfect sealing, thanks to the overmoulding.

It is moreover possible, at the moment of the operation of injection of the polymer, to add, to the injected material, carbon nanotubes to improve the evacuation of heat by the moulding material while the element is in operation. The use of carbon black to obtain this effect is also possible. But, the addition of carbon nanotubes is efficient even if said nanotubes are present in very low proportion (0.1% by weight suffices; whereas much greater proportions (at least 40% by weight) of carbon black are needed to obtain the same effect. To conserve the electrical insulation properties of one nanotubes, they may be sheathed in polyethylene.

Nanowires, for example nanowires of silicon, and/or carbon and/or copper and/or aluminium, for example in a proportion between 1% and 5% by weight, may also be used.

The addition, to the moulding material, of a component enabling the evacuation of the heat will have all the more interest if the fuel cell implemented supplies a high power.

Figure 14:
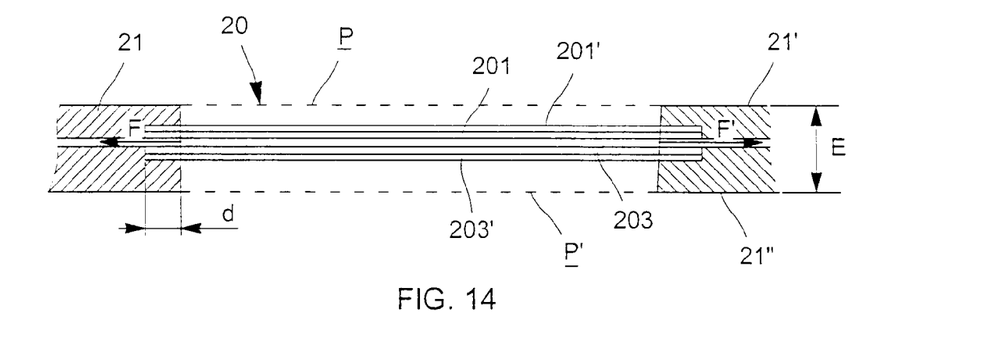
FIG. 14 is a sectional view of the assembly of an MEA with its support, according to the invention.

As illustrated in FIG. 14, the means for holding together (here: the moulding of the ring 21) are going to make it possible to mould or embed the edges of the membrane of each side of each MEA, and also the edges of each electrode 201, 203 and its coating 201', 203', on either side of the membrane. Since the materials of the electrodes and the coating are porous, the polymer is going to penetrate them totally, which reinforces the mechanical holding together of the set by the moulded material. More precisely, the polymer may penetrate the porous material, which constitutes each electrode and the coating, corresponding, over a distance d of the order of several millimeters, for example between 1 mm and 5 mm. The ring 21 itself has a thickness E substantially between 1 mm and 3 mm.

The moulding will enable a mechanical strain (symbolised in FIG. 14 by the arrows F, F') to be applied to the membrane, to its electrodes and to its coating. The strain applied will be such that the membrane cannot deform, beyond a defined limit, on each side of the "membrane-membrane maintaining element" set, by a plane P, P' that rests on the outer surface 21', 21" of the support and which is thus substantially parallel to the membrane. Preferably, the strain applied makes it possible to take account of the effect of water on the membrane, which is going to slacken said membrane, during use, by around 10%.

Figure 4A:
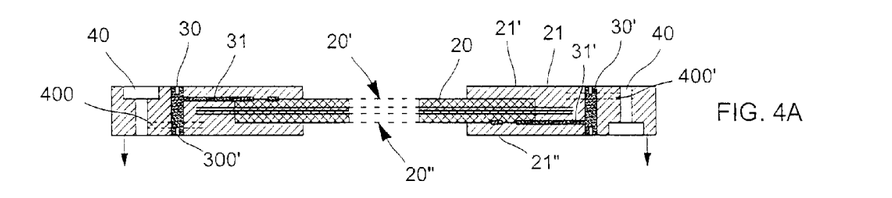
Figure 4B:
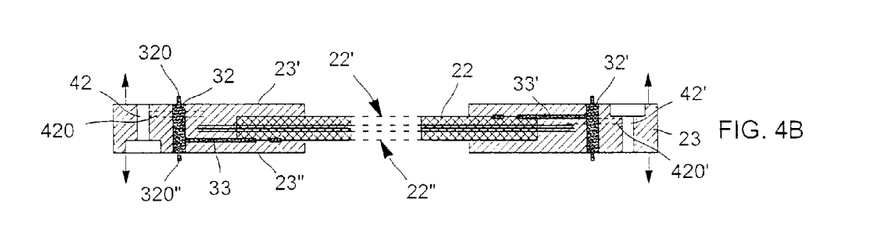
Figure 4C:
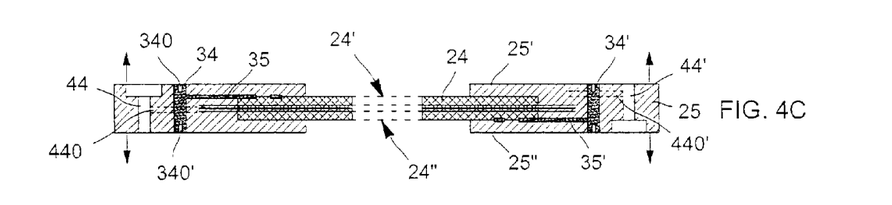
Figure 4D:
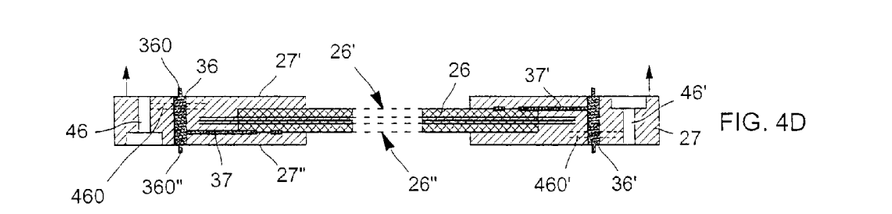
Figure 5A:
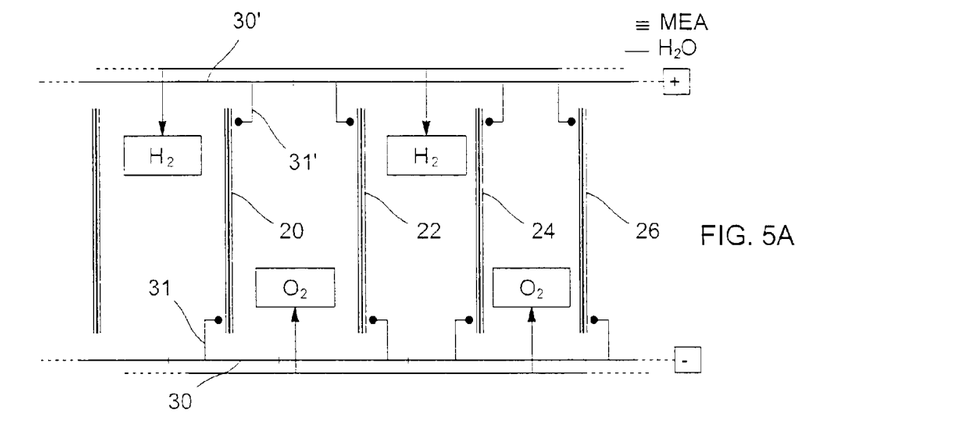
FIG. 5A represents a simplified plan of the architecture of the elements of FIGS. 4A to 4D, alter assembly.
Figure 5B:
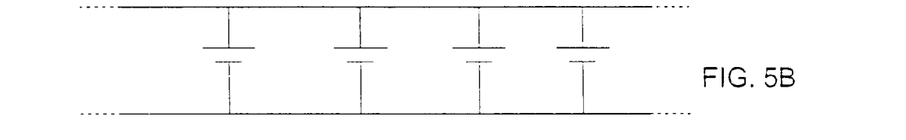
FIG. 5B represents an equivalent electrical diagram of the assembly of elements of FIGS. 4A-4D, FIGS. 6A to 6D represent other elements according to the invention, intended to be assembled to form a fuel cell.
Figure 6A:
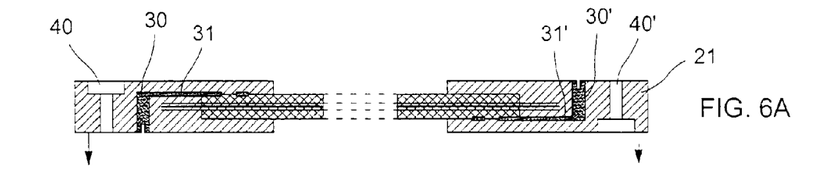
Figure 6B:
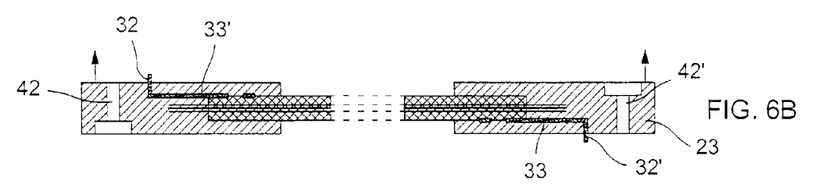
Figure 6C:
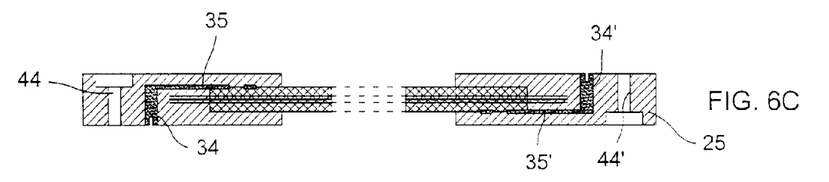
Figure 6D:
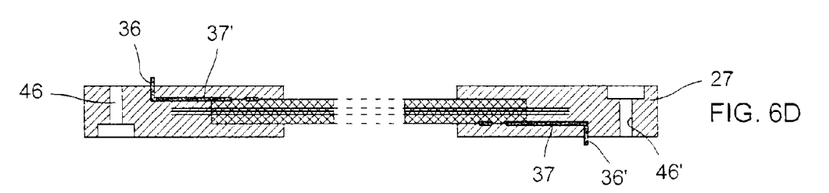

The above considerations apply not only for the MEA 20 and the corresponding element of FIG. 4A, but also for each of the MEA of FIGS. 4B-4D and 6A-6D.

A method for making a cell according to the invention will now be described.

It involves a method in which a frame or a support is moulded onto the periphery of an MEA, for example by injection of a thermoplastic polymer into a mould.

In a first step, this moulding, or overmoulding, makes if possible to form directly, around the MEA, a frame or a support that embeds it in a manner leak tight to hydrogen and to oxygen.

The overmoulding is without joint, without tightening component and integrates channels for the distribution of gas and the recovery of the water produced at the cathode (they are for example the channels 40, 40' of FIG. 4A).

A second step may be the overmoulding of metal inserts, or injection of a conductive nanocomposite polymer based on carbon nanotubes or any conductive object. The shape and the lay out of these overmoulded inserts makes it possible to carry out, according to the needs of the applications, an assembly in parallel (case of FIGS. 4A-4E, 5A, 5B), or in series (case of FIGS. 6A-6D, 7A, 7B) or a combination of these two configurations. The design of the inserts and their lay outs determine the final electrical configuration.

If the electrical connection means have the shape described above with reference to FIG. 9, the second step does not then comprise operations of overmoulding of metal inserts, but the simple formation, by cutting of openings 77, 79 (see FIG. 9) and the introduction, info said openings, of the corresponding connectors 72.

One of the advantages of the injection technique is the reproducibility of the measurements of each part, even if each of these measurements is not of an extreme precision. The problems linked to the precision necessary during the use of a technique such as that described in document US 2003/235 744 are thus avoided.

The assembly of the elements is preferably carried out by a welding method (FIGS. 12A-12E). As already explained above, an assembly by bonding is also possible, but less efficient from the sealing point of view.

To implement a welding method, preferably the "hot plate" technique is used, as well as two jaws 100, 102 of a press 104. On each of these taws is positioned one of the two parts to be assembled; the example of the elements of FIGS. 4A and 4B will here be taken. The two elements are here positioned so as to be aligned with each other. The alignment may be carried out by use of electrical contact means 30, 30', 32, 32' formed in the insulating parts of the two elements to be assembled. For example, the resistance through the two elements positioned against each, other icy closing of the jaws, but not yet finally assembled, is measured.

Then a fusion is carried cut of the surfaces of the MEA supports to be brought into contact, not just on the insulating parts but also on the conductive parts (in other words the ends of the conductive portions 30, 30', 32, 32' or the ends of the conductors 72 after their introduction into the corresponding orifices).

A blade 106 (hot plate) comprises an internal resistance that enables its surfaces 106', 106" to attain a predetermined temperature.

The heating blade, heated to the requisite temperature, is then placed in position between the two elements (see FIG. 12B), that the jaws 100, 102 of the press bring into position against the hot plate 106. This step makes it possible to neat each of the two surfaces to be assembled to the requisite temperature.

Figure 12A:
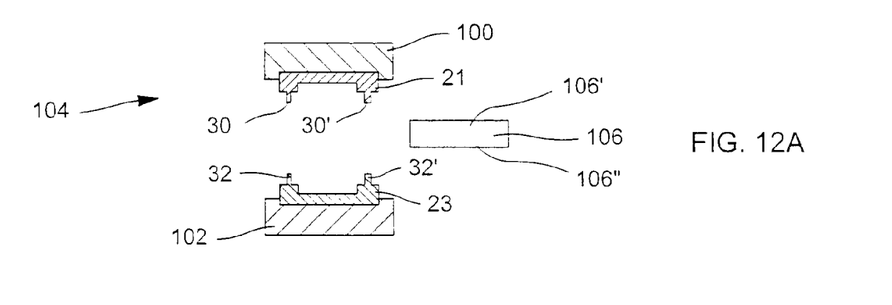
FIGS. 12A-12E represent steps of a method of assembly of individual elements according to the invention.
Figure 12B:
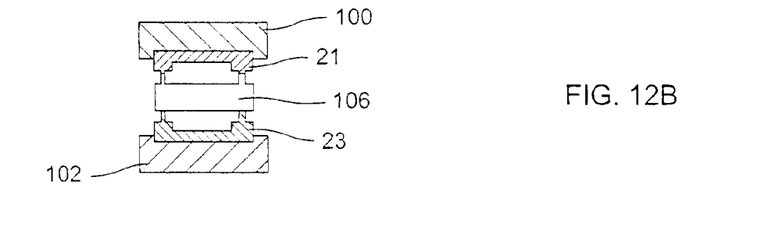
Figure 12C:
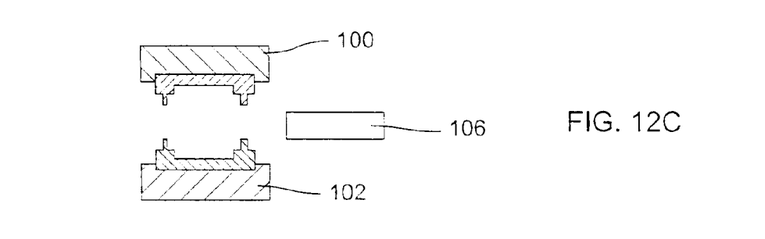

The jaws then move apart the two elements of the heating blade 106, which is then rapidly removed (FIG. 12C).

Figure 12D:
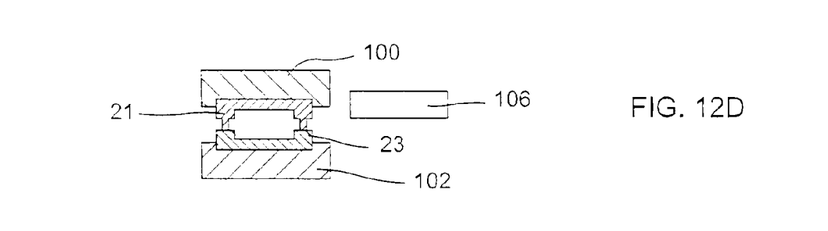
Figure 12E:
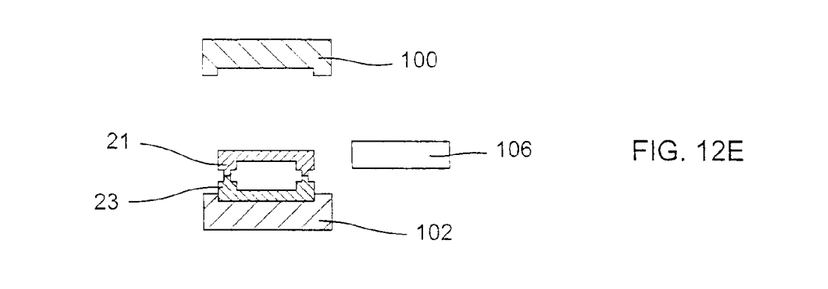

The two jaws of the press may then again be brought closer together, until the two elements to be assembled are in contact with each other (FIG. 12D). This contact position is maintained during the cooling.

It is not necessary to strongly tighten the two elements to be assembled, which constitutes a very important difference compared to the techniques known in the prior art: all the problems that result from the tightening operations, problems already explained in detail in the introduction to the present application, are avoided. A tightening pressure of around 0.5 MPa is sufficient: such a pressure is, by the nature of the method chosen, spread out uniformly over the surfaces in contact, and, moreover, not on the core of the membrane.

One of the two jaws, here the upper jaw, may then be moved away (FIG. 12E): the assembly of the two elements is thus carried out uniquely by means of polymer embeddings.

After fluxing, the two elements are assembled and slow cooling assembles the two cells in a definitive manner, sealed, without joint and without tightening component. The welding area is constituted of recrystallised polymer that has excellent sealing and mechanical properties. During this assembly operation, the shear movements are very slight, because only a very small thickness of each element made of embedding material is molten (typically around 2 μm).

These two elements assembled form in their turn an assembly that may itself be assembled with another element or with another set of elements already assembled. It is thus possible to form progressively a stack of any number of elements, for example of the type illustrated in FIGS. 11A, 11B already explained above. The contact elements 70, 72, 76 do not extend beyond. In addition, the IR heats the polymers and not the metal parts.

The assembly technique described above may be implemented from the moment that the material used to make the rings is thermofusible at T<300° C.

As already indicated above, a means of aligning two elements positioned in a press, before thermo-assembly, consists in carrying out a control of the electrical conductivity through the assembly of two elements superimposed and in contact. Other alignment techniques may be implemented such as centring pads included in the elements.

To this end, one jaws 100, 102 of the press 104 may be equipped with means for measuring the resistance or the resistivity through a stack of two or more elements assembled between the two jaws. A structure with two jaws that may be advantageously used is thus illustrated on FIG. 13. Said two jaws are equipped with means 110, 112 intended to come into contact, for example by contact pads or cones 111, 113, with the contact means situated in the embedding material. There may be several contact plots or cones at the surface of each of the jaws, as is the case moreover in FIG. 13, so as to be able to carry out electrical conductivity tests at various points of each of the surfaces situated opposite the jaws.

During an alignment test, measuring means (not represented in FIG. 13) may be connected to the means 110, 112 by means of electrical connections 115, 117.

Figure 13:
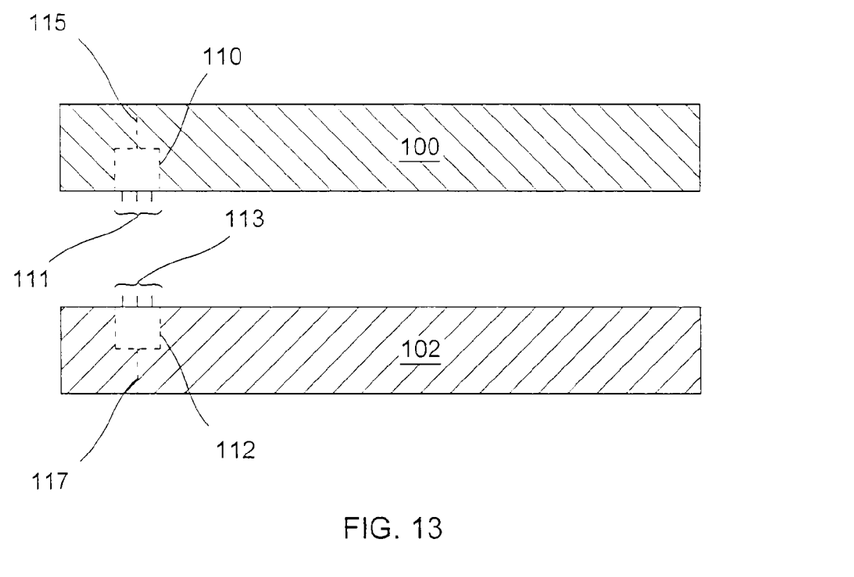
FIG. 13 represents jaws of a press that may be used within the scope of a method of assembly of elements according to the invention.

It is also possible to provide for an emplacement, in each of the jaws 100, 102, to receive a contact module adapted to the shape of certain embedding elements. Thus, when the shape of the elements to be assembled varies, the contact zone may be adapted without the jaw losing its function of electrical control.

A cell structure according to the invention enables a fuel cell to be made, by assembly of a plurality of such cells, the power density of which is markedly greater than the densities usually encountered in this type of device. Thus, densities greater than 400 W/kg are easily obtained whereas, with identical membranes of the same size, known techniques only make it possible to form cells on which the power density is of the order of 200 to 250 W per kg. A fuel cell according to the invention no longer comprises any bipolar plate, or any joint, or any tightening plate. Furthermore, it is not necessary to maintain the different elements with high pressures, since the welding or the bonding makes it possible to ensure one holding of the elements together.

The invention claimed is:

1. A fuel cell element, comprising:
   an assembly of a membrane, a first electrode, and a second electrode; and
   a ring shaped peripheral support holding the assembly together, comprising electrical connectors and fluid supply and circulation channels for circulation of fluid and for supply of the fluid into the assembly, the ring shaped peripheral support applying a strain to the membrane such that, on each side of the assembly comprising the membrane and the ring shaped peripheral support, the membrane cannot deform beyond a plane that lies on an outer surface of the support and that is substantially parallel to the membrane, and an active part of the membrane is not in contact with a bipolar plate.

2. An element according to claim 1, the ring shaped peripheral support being made of a thermoplastic polymer.

3. An element according to claim 2, the thermoplastic polymer being made of polyethylene, or polypropylene, or polystyrene, or COC (cyclo olefin copolymer), or PTFE (or Teflon), or PET, or PEEK (polyether ether ketone).

4. An element according to claim 2, further comprising, within the thermoplastic polymer, one or more of nanotubes or nanowires, the nanotubes including carbon or carbon black, and the nanowires including at least one of silicon, carbon, a copper, or aluminium.

5. An element according to claim 1, the electrical connectors comprising at least one conductive insert connected to at least one of the electrodes of the membrane.

6. An element according to claim 1, the electrical connectors being metal, or made of a conductive polymer, or a polymer with carbon nanotubes or with nanowires.

7. An element according to claim 1, the electrodes of each membrane being made of carbon fiber or a weaving of carbon fibers with wires of gold, or copper, or aluminium.

8. An element according to claim 1, the fluid supply and circulation channels comprising lateral channels that traverse the support, and channels for distribution of fluid, from the lateral channels to the membrane-electrodes assembly.

9. An element according to claim 8, the channels for the distribution of fluid comprising islands that guide the fluid to the assembly.

10. An element according to claim 1, the electrodes being made of a porous material, and the ring shaped peripheral support being made of a material that penetrates into the porous material.

11. An element according to claim 1, the electrical connectors comprising at least two conductive elements that traverse the support, and in which at least one of the two is connected, by a secondary conductor, to one of the first and second electrodes.

12. An element according to claim 1, the electrical connectors comprising at least two conductive elements that only traverses the support in part and from different faces of the support, and each one of which is connected, by a secondary conductor, either to one or to the other of the first and second electrodes.

13. A fuel cell, comprising:
    a stack of the fuel cell elements according to claim 1, electrical connectors of neighbouring fuel cell elements being connected together and the fluid circulation channels forming at least one circuit for the flow of fluid through the stack.

14. A fuel cell according to claim 13, the elements being welded two by two.

15. A fuel cell according to claim 13, the electrical connectors being assembled so as to form a circuit with connection in series, or with connection in parallel, or with connection partially in series and partially in parallel.

16. A fuel cell according to claim 13, the stack of elements being between an input face and an output face, the input face comprising means for introducing gas, and one of the two input and output faces comprising electrical connectors.

17. A fuel cell according to claim 16, the means for introducing gas comprising at least two flow rate regulators.

18. A fuel cell according to claim 16, further comprising a return electrical circuit, between the face that comprises the electrical connectors and the fuel cell element of the stack that is furthest from the face.

19. An element according to claim 8, the channels for the distribution of fluid comprising islands that guide the fluid to the assembly, the islands being in addition to walls of the channels.

20. An element according to claim 1, wherein, with respect to a cross-section taken perpendicular to a largest surface of the membrane, said fluid supply and circulation channels are disposed entirely outside of outer-most edges of the largest surface of the membrane.

21. A fuel cell element, comprising:
    an assembly of a membrane, a first electrode, and a second electrode; and
    a ring shaped peripheral support holding the assembly together, comprising electrical connectors and fluid supply and circulation channels for circulation of fluid and for supply of the fluid into the assembly, the ring shaped peripheral support applying a strain to the membrane such that, on each side of the assembly comprising the membrane and the ring shaped peripheral support, the membrane cannot deform beyond a plane that lies on an outer surface of the support and that is substantially parallel to the membrane,
    wherein the electrical connectors comprise at least two conductive elements that traverse the support, and at least one of the at least two conductive elements is connected, by a secondary conductor, to one of the first and second electrodes.

22. An element according to claim 21, the fluid supply and circulation channels comprising lateral channels that traverse the support, and channels for distribution of fluid, from the lateral channels to the membrane-electrodes assembly.

23. An element according to claim 22, the channels for the distribution of fluid comprising islands that guide the fluid to the assembly.

24. A fuel cell, comprising:
    a stack of the fuel cell elements according to claim 21, the electrical connectors of neighbouring fuel cell elements being connected together and the fluid circulation channels forming at least one circuit for the flow of fluid through the stack.

25. A fuel cell according to claim 24, wherein the stack of elements is between an input face and an output face, the input face comprising means for introducing gas, and one of the two input and output faces comprising electrical connectors; and
    the fuel cell further comprises a return electrical circuit, between the face that comprises the electrical connectors and the fuel cell element of the stack that is furthest from the face.

26. An element according to claim 21, wherein an active part of the membrane is not in contact with a bipolar plate.

27. A fuel cell element, comprising:
    an assembly of a membrane, a first electrode, and a second electrode; and
    a ring shaped peripheral support holding the assembly together, comprising electrical connectors and fluid supply and circulation channels for circulation of fluid and for supply of the fluid into the assembly, the ring shaped peripheral support applying a strain to the membrane such that, on each side of the assembly comprising the membrane and the ring shaped peripheral support, the membrane cannot deform beyond a plane that lies on an outer surface of the support and that is substantially parallel to the membrane, wherein the electrical connectors comprise at least two conductive elements that only traverse the support in part and from different faces of the support, and each one of the at least two conductive elements is connected, by a secondary conductor, either to one or to the other of the first and second electrodes.

28. An element according to claim 27, the fluid supply and circulation channels comprising lateral channels that traverse the support, and channels for distribution of fluid, from the lateral channels to the membrane-electrodes assembly.

29. An element according to claim 28, the channels for the distribution of fluid comprising islands that guide the fluid to the assembly.

30. A fuel cell, comprising:
a stack of the fuel cell elements according to claim 27, electrical connectors of neighbouring fuel cell elements being connected together and the fluid circulation channels forming at least one circuit for the flow of fluid through the stack.

31. A fuel cell according to claim 30, wherein the stack of elements is between an input face and an output face, the input face comprising means for introducing gas, and one of the two input and output faces comprising electrical connectors; and
the fuel cell further comprises a return electrical circuit, between the face that comprises the electrical connectors and the fuel cell element of the stack that is furthest from the face.

32. An element according to claim 27, wherein an active part of the membrane is not in contact with a bipolar plate.

* * * * *